United States Patent [19]

Abe

[11] Patent Number: 5,533,906

[45] Date of Patent: Jul. 9, 1996

[54] MEMORY CARD CONNECTOR

[75] Inventor: Hiroshi Abe, Yokohama, Japan

[73] Assignee: Hon Hai Precision Industry Co., Ltd., Taipei Hsien, Taiwan

[21] Appl. No.: 299,482

[22] Filed: Aug. 31, 1994

[30] Foreign Application Priority Data

Sep. 27, 1993 [JP] Japan ................................. 5-240152
Sep. 28, 1993 [JP] Japan ................................. 5-052460 U

[51] Int. Cl.⁶ .................................................. H01R 13/62
[52] U.S. Cl. .......................................... 439/159; 439/157
[58] Field of Search .................................. 439/152–160, 439/372

[56] References Cited

U.S. PATENT DOCUMENTS 4,952,161  8/1990  Komatsu ................................. 439/155
5,275,583  1/1994  McCleerey ............................. 439/153

*Primary Examiner*—David L. Pirlot
*Attorney, Agent, or Firm*—John J. Leavitt

[57] ABSTRACT

A memory card connector (10) comprises an insulative housing (12) having a plurality of contacts for electrically mounting on a board on which the connector (10) is seated. A pair of engaging arms (18) respectively extend backward from two opposite ends of the housing (12). A right insulative guiding arm (44) and a spaced and parallel left insulative guiding arm (42) are respectively fastened to two opposite ends of a securing plate (30) to form an initial generally U-shaped unit. A sliding plate (56) is attached to the initial U-shaped unit and a swinging lever (62) is sandwiched therebetween. A pushing bar (70) is positioned beside the left guiding arm (42) and moveable in with regard to the securing plate (30). One end (65) of the lever (62) is connected to the distal end of the pushing bar and the other end of the lever (62) is engaged with the sliding plate (56), so that the pushing bar (70) and the sliding plate (56) can be moved in opposite directions with each other. The housing (12) and the final U-shaped unit can be assembled together by means of the engagement of the engaging arms (18) thereof with the securing plate (30).

16 Claims, 5 Drawing Sheets

MEMORY CARD CONNECTOR

BACKGROUND OF THE INVENTION

1. Field of The Invention

The invention relates to a modular holder for IC packs, such as a memory card, and more particularly to a device having a structure which is easy for manufacturing and assembling.

2. The Prior Art

Memory cards or IC cards which are used in a variety of electronic equipment, such as a computer, contain a number of circuits interconnected to the corresponding circuits of a circuit board in the computer through a memory card connector mounted on such circuit board wherein such memory card connector generally comprises a main frame for guiding and receiving the inserted memory card therein. In this situation, the contacts at the mating edge of the memory card are aligned with and electrically and mechanically engaged with the corresponding contacts positioned in the mating portion of the memory card connector. Since the memory card may be removed from electrical engagement with the connector, it is also desired that there be some means to readily eject the memory card from engagement with the memory card connector.

Except rare practices such as disclosed in U.S. Pat. Nos. 5,234,351, 5,315,478 and 5,320,540 each of which generally uses a simple and crude structure including a handle directed mounted on a pulling plate for pulling out the inserted memory card in the connector, most recent memory card connectors prefer to use ejection mechanism of a combination of a rotatable lever respectively connecting at its two opposite ends a pushing bar and a sliding plate for ejecting the inserted memory card therefrom for easy operation and force-economizing due to the lever effect. The lever type memory card connectors are found in U.S. Pat. Nos. 4,810,200, 4,843,221, 4,952,161, 5,011,420, 5,026,296, 5,033,972, 5,051,101, 5,139,435, 5,145,389, 5,149,276, 5,152,697, 5,161,989, 5,197,894, 5,286,214, 5,299,946, 5,304,070, 5,316,488, 5,324,204, and 5,330,363.

Miniaturization is a trend in the computer design including its internal electrical components. The memory card connector used in the computer is also required to reduce its dimension without exception. Most lever type memory card connectors have larger heights due to the structural existence of such ejection mechanism thereon, and this phenomenon is opposed to the aforementioned miniaturization trend. Additionally, most conventional memory card connectors need to use screwing or riveting method for fastening the corresponding components together, and therefore, it takes time and labor, and also generally precludes reduction of the thickness of the memory card connector of miniaturization consideration.

Accordingly, an object of the present invention is to provide a memory card connector of which the components are adapted to be assembled together without screwing or riveting procedure for not only easy assembling and saving time and labor, but also achieving a low profile of such connector. Another object of the invention is to provide a memory card connector which has less portions thereof in comparison with the prior art connectors, so that it saves material and money to lower the whole cost of such connector.

SUMMARY OF THE INVENTION

According to an aspect of the invention, a memory card connector comprises an insulative housing having a plurality of contacts for electrically mounting on a board on which the connector is seated. A pair of engaging arms respectively extend backward from two opposite ends of the housing. A right insulative guiding arm and a spaced and parallel left insulative guiding arm are respectively fastened to two opposite ends of a securing plate to form an initial generally U-shaped unit. A sliding plate is attached to the initial U-shaped unit and a swinging lever is sandwiched therebetween. A pushing bar is positioned beside the left guiding arm and moveable in with regard to the securing plate. One end of the lever is connected to the front end of the pushing bar and the other end of the lever is engaged with the sliding plate, so that the pushing bar and the sliding plate can be moved in opposite directions with each other. The housing and the U-shaped unit can be assembled together by means of the engagement of the engaging arms thereof with the securing plate.

DETAILED DESCRIPTION OF THE PREFERRED EMBODIMENT

References will now be made in detail to the preferred embodiments of the invention. While the present invention has been described with reference to a specific embodiment, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
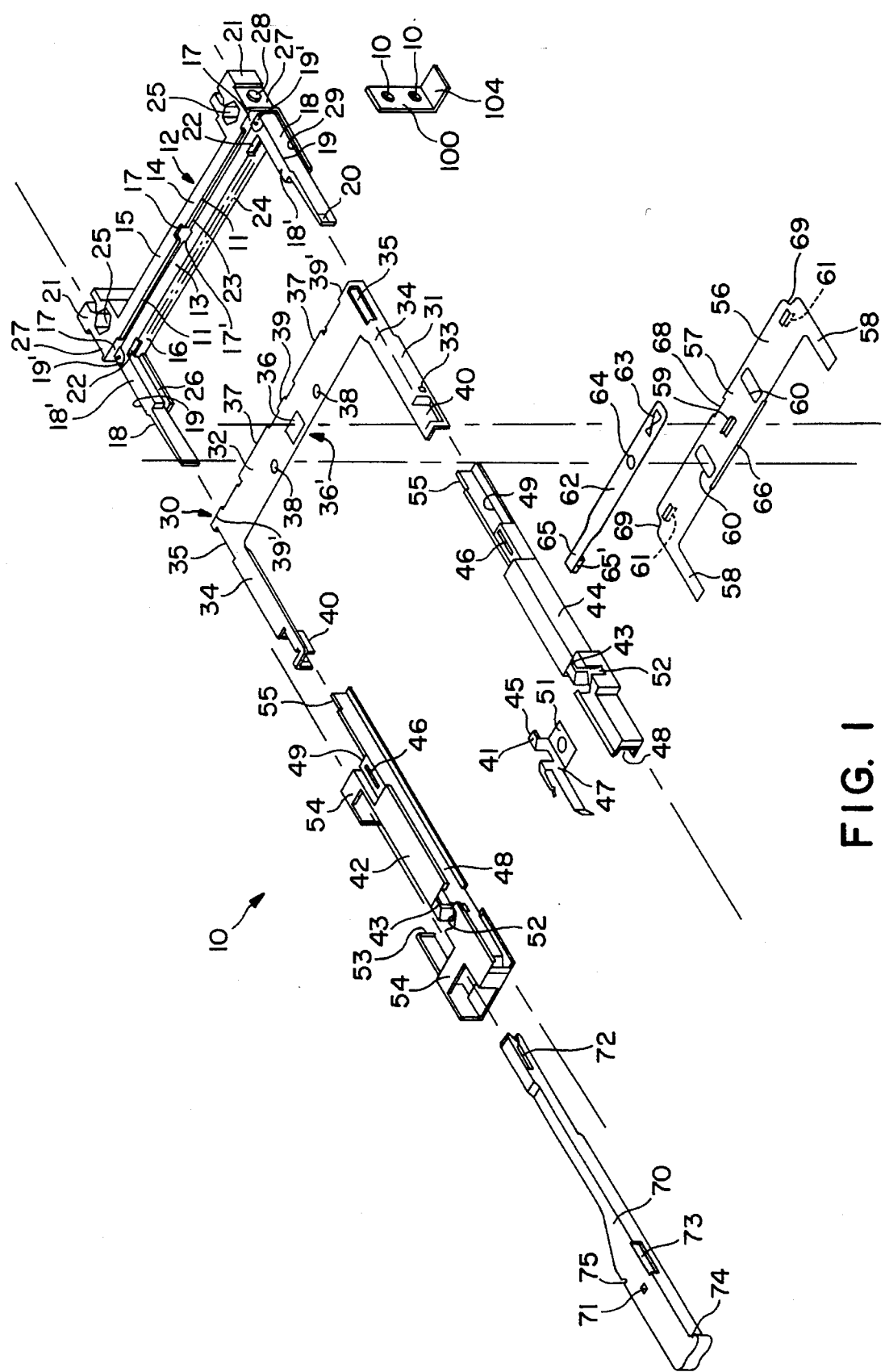
FIG. 1 is an exploded perspective view of a memory card connector without the contacts therein of a presently preferred embodiment according to the invention.

It will be noted here that for a better understanding, like components are designated by like reference numerals throughout the various figures in such embodiment. Attention is now directed to FIG.1 wherein a memory card connector 10 includes an insulative housing 12 having an elongated main body 14. A plurality of passageways 16 extend through the main body 14 in a front-to-end direction for receiving the corresponding contacts (not shown) therein. A left and a right engaging arms 18 forwardly extend respectively from two opposite ends of the main body 14 so that a space is defined by such pair of engaging arms 18 and the main body 14 for receiving a memory card therein. Each engaging arm 18 has a protrusion 20 (only one shown) extending outwardly at its distal end for latchable engagement with a securing plate which will be illustrated later.

A pair of indents 22 are respectively positioned around the corners of the intersections of the main body 14 and the corresponding engaging arms 18, and recessed from the mating surface 24 of the main body 14 for receiving a pair of pushing hooks or plate projections of a sliding plate which will be illustrated later. A low slot 26 extends horizontally along a rear portion of the left engaging arm 18 and to the mating surface 24 of the main body 14. Similarly, another high slot (not shown) also extends horizontally along a rear portion of the right engaging arm 18 and to the mating surface 24 of the main body 14. Because the memory card has different height protrusions at its two opposite side edges, the height difference between such low slot 26 in the left engaging arm 18 and the opposite high slot (not shown) in the right engaging arm 18 of the memory card connector 10 can prevent the memory card from being inserted therein in an erroneous upside-down manner.

An elongated recess 13 extends along a portion of the top surface 15 of the main body 14, and a pair of protrusion bars 11 forwardly extend flush with the top surface 15 of the main body 14 and above the recess 13 in a cantilever manner. Therefore, a slot 23 is formed below each protrusion bar 11 in the recess 13, and three indents 17 are formed beside the protrusion bars 11. A protrusion 17' is positioned within the slot 23 in vertical alignment with the middle indent 17. A restraint bar 19 upward extends along the outer side edge of the top surface of the front portion of each engaging arm 18, thus forming an inner recess 18' thereof accordingly. A side recess 29 is formed on the side surface of each engaging arm 18, and a pair of standoffs 19' are located at two opposite corners of the intersections defined by the main body 14 and the engaging arms 18.

A pair of mounting blocks 21 extend forwardly at two opposite ends of the main body 14 and opposite to the corresponding engaging arms 18, respectively. Each block 21 has a screw cavity 25 to receive a screw (not shown) therein for mounting the connector 10 on a board (not shown). A bracket recess 27 is formed on the side wall of each block 21, and a boss 28 protrudes laterally in the recess 27.

A securing plate 30 is formed by a metal blank having generally U-shaped body including an elongated base 32 and two angle iron shaped legs 34 integrally extending forwardly at two opposite ends thereof. An upward embossment region 36 is positioned at the middle portion of the base 32, forming a receiving cavity thereunder. A pair of circular flanges 38 are oppositely positioned beside the embossment region 36 wherein each flange 38 extends downward from a periphery of a round hole in the base 32. A center downward biased protrusion 39 extends forwardly from a front edge of the plate 30, and a pair of downward biased projections 37 also extend forwardly from the front edge of the plate beside the center protrusion 39. An opening 35 is disposed at each end of the base 32.

An aperture 33 is positioned in the side wall 31 of each leg 34. A tab 40 is stamped out of the leg 34 and extends downward for securement. A left insulative guiding arm 42 and a right insulative guiding arm 44 are respectively fixed to the securing plate 30 by means of the tabs 40 of the legs 34 inteferentially inserted into cavities 46 of the guiding arms 42, 44. Each guiding arm 42, 44 has an inside channel 48 for guiding the inserted memory card (not shown) within the connector 10. A recess 55 is positioned at the front end of each guiding arm 42, 44 and a space 49 is formed proximate the front portion of each guiding arm 42, 44. Oppositely, a grounding clip 47 is fastened to the rear end of each guiding arm 42, 44 by means that a hook 45 of the grounding clip 47 is locked within a slot 43 in the guiding arm 42, 44 and the corresponding portion of the guiding arm 42, 44 is sandwiched between the hook portion 41 and the plate portion 51 of the grounding clip 47, also referring to FIG. 3. The plate portion 51 has a hole aligned with a counter-bore 52 which is embedded within the rear portion of the guiding arm 42, 44. Differently from the right guiding arm 44, the left guiding arm 42 has integrally further a pair of spaced holding seats 54 through which a pushing bar 70 can move in a front-to-end direction. A latching projection 53 is positioned on the outermost side of the pair of holding seats 54.

A sliding plate 56 positioned below the securing plate 30 includes an elongated base section 57 and a pair of extension sections 58 disposed on two opposite ends thereof. A first plate projection 59 extends upward on the middle of the base section 57 by slitting the corresponding portion thereof. A pair of longitudinal apertures 60 are provided in the base section 57 by two sides of the projection 59 in the front-to-end direction. A pair of second plate projections 61 extend downward in the vicinity of the two opposite ends of the base section 57 by slitting the corresponding portion thereof. An elongated flange 66 upward stands from the rear edge, a first recess 68 and a pair of second recesses 69 are positioned at the mid-point and two opposite ends of the front edge, oppositely.

Figure 7:
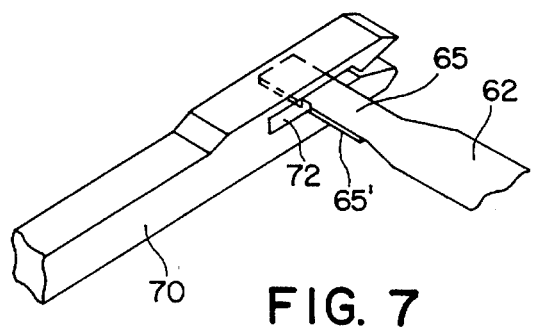
FIG. 7 is an enlarged view of the front end of the lever and the corresponding distal end of the pushing bar to illustrate the assembling therebetween.

An eject lever 62 includes a round aperture 64 dimensioned to compactly receive the circular flange 38 of the securing plate 30 therein. A hourglass-like hole 63 is formed at one end of the lever 62 and a narrowed extension 65 is positioned at another end thereof. Also, referring to FIG. 7, such narrowed extension 65 has downward extending flanges 65' at its two sides for reinforcement of the strength thereabout so that such extension 65 will not be easily deformed during actuation by a pushing bar.

The pushing bar 70 has a horizontal through slot 72 at the front end for reception of the narrowed extension 65 of the lever 62 therein. A stopper 74 protrudes laterally in a left-to-right direction. An embossment 71 is positioned on the top surface of the of the rear portion of the pushing bar 70. An indent 73 is recessed from the inner side surface of the pushing bar 70, and a notch 75 is formed on the outer side thereof.

Figure 6:
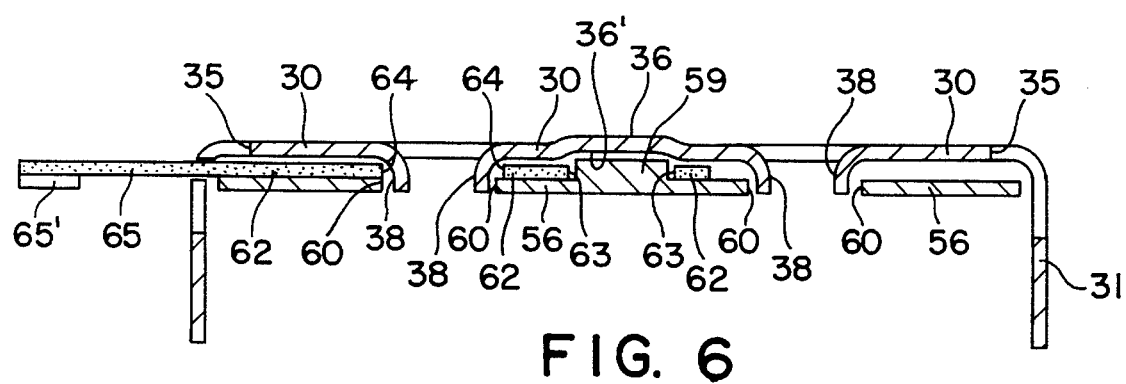
FIG. 6 is an enlarged cross-sectional view of the combination of the securing plate, the sliding plate and the lever sandwiched therebetween.

When assembled, the left guiding arm 42 and the right guiding arm 44 are respectively fixed to the securing plate 30 by means of the tabs 40 of the legs 34 of the securing plate 30 inteferentially inserted into cavities 46 of the guiding arms 42, 44, respectively. Therefore, the left guiding arm 42, the right guiding arm 44 and the securing plate 30 are fastened together as an initial U-shaped unit. The sliding plate 56 is attached to the bottom of the securing plate 30 under the condition that the extension sections 58 project into the indents 55 of the guiding arms 42, 44 and as shown in FIG. 6, the flanges 38 of the securing plate 30 are freely but restrainedly fitted within the apertures 60 of the sliding plate 56, and the first plate projection 59 extends into the cavity 36' under the embossment region 36, so that the sliding plate 56 is able to move in the front-to-end direction between the securing plate 30 and the front end portions of the guiding arms 42, 44 within the range confined by the lengthwise dimension of the aperture 60 in the sliding plate 56 or the embossment region 36 of the securing plate 30. The pivotal lever 62 is sandwiched between the securing plate 30 and the sliding plate 56 wherein the aperture 64 of the lever 62 properly surrounds the flange 38 of the securing plate 30, and the first plate projection 59 is freely received within the hole 63 of the lever 64. Also referring to FIG. 7, the distal end 65 of the lever 62 extends through the opening 35 of the securing plate 30 and is engagingly received within the slot 72 of the pushing bar 70 which has been forced to be inserted through the spaced pair of holding seats 54 from the rear side so that the forward movement of the pushing bar 70 can connectively push the lever 62 to be clockwise pivoted around the aperture 64 of the lever 62. Thus, the hole 63 of the lever 62 will naturally oppositely move rearward, and push the first plate projection 59 of the sliding plate 56 rearward; therefore, the whole sliding plate 56 can be moved rearward. In contrast, the backward movement of the sliding plate 56 will result in the counter-clockwise rotation of the lever 62 to have the distal end 65 of the lever 62 move rearward, and thus the pushing bar 70 is moved back to its rearward position.

Figure 5:
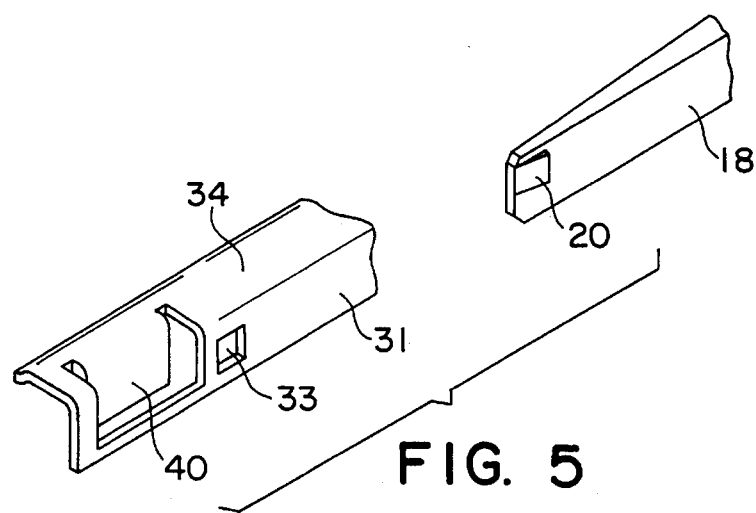
FIG. 5 is an enlarged view of the engaging arm of the housing and the corresponding securing plate to illustrate the engagement therebetween.

Lastly, the housing 12 is attached to the aforementioned U-shaped unit including the securing plate 30, the sliding plate 56 and the lever 62 sandwiched therebetween, and the guiding arms 42, 44 with the associated pushing bar 70 to form the final combination by means of the lateral protrusions 20 latchably engaging within the apertures 33 of the legs 34, as shown in FIG. 5. Under this situation, the rear portion of each engaging arm 18 is substantially received within the space 49 and covered by the corresponding leg 34 of the securing plate 30. The sliding plate 56 including the base section 57 and the extension sections 58 is substantially supported by the guiding arms 42, 44, and the engaging arms 18 and the main body 14 of the housing 12 wherein the base section 57 is movably received in the recess 13 of the main body 14 of the housing 12, the extensions 58 are movably received in the recesses 18' of the engaging arms 18 of the housing 12, respectively, and the rear ends of each extensions 58 are movably received in the recesses 55 of the corresponding guiding arms 42, 44, respectively.

The side walls 31 of the securing plate 30 are tightly received in the side recesses 29 of the engaging arms 18, respectively. The center biased protrusion 39 and two opposite forwardly projecting end portions 39' of the base 32 of the securing plate 30 are engagingly received in the corresponding indents 17 of the housing 12. The biased projections 37 are receptively engaged within the slot 23 below the protrusion bar 11 of the housing 12 so that the front portion of the securing plate 30 can be securely fixed to the housing 12 and thus it assures that the sliding plate 56 and the lever 62 are properly tightly sandwiched between the securing plate 30 and the housing 12.

When the memory card is inserted into the connector 10 along the inside channels 48 of the two spaced guiding arms 42, 44, the front mating surface of the memory card confronts the second plate projections 61 of the sliding plate 56 and pushes the sliding plate 56 to move forwardly until the front mating surface of the memory card abuts against the mating surface 24 of the main body 14 of the housing 12. Through this mating, the contacts of the connector 10 and the contacts of the memory card can be coupled together for electrical connection. Under this situation, the front portion of the sliding plate 56 is positioned in the recess 13 of the housing, and the front edge portions of the sliding plate 56 enter the slot 23. Therefore, naturally the protrusion 17' of the housing 12 can be engaged within the first recess 68 of the sliding plate 56, and the standoffs 19' of the housing 12 are respectively engaged within the second recesses 69 of the sliding plate 56. The two opposite second plate projections 61 of the sliding plate 56 are respectively received within the indents 22 of the housing 12, and the flange 66 of the sliding plate 56 butts against the rear edge of the securing plate 30.

Hence, the sliding plate 56 is properly located in position. As aforementioned, during this forward movement of the sliding plate 56, the first plate projection 59 pushes the periphery of the hole 63 of the lever 62. Through the engagement of the distal end 65 of the lever 62 within the slot 72 of the pushing bar 70, the pushing bar 70 is thus moved rearward according to "Principle of Lever" based on a pivoting point formed by the flange 38 of the securing plate 30 within the aperture 64 of the lever 62. The rearward movement of the pushing bar 70 will be restrained by engagement of the embossment 71 with the rear holding seat 54 beside the left guiding arm 42.

It can be understood that the longitudinal aperture 60 of the sliding plate 56 allows the corresponding upward projecting flange 38 of the securing plate 30 relatively moves therein in the front-to-end direction, so that the sliding plate 56 will not be obstructed by such flange 38 of the securing plate 30. Also, the upward embossment region 36 of the securing plate 30 can allow the aligned movement of the first plate projection 59 therein.

Figure 2:
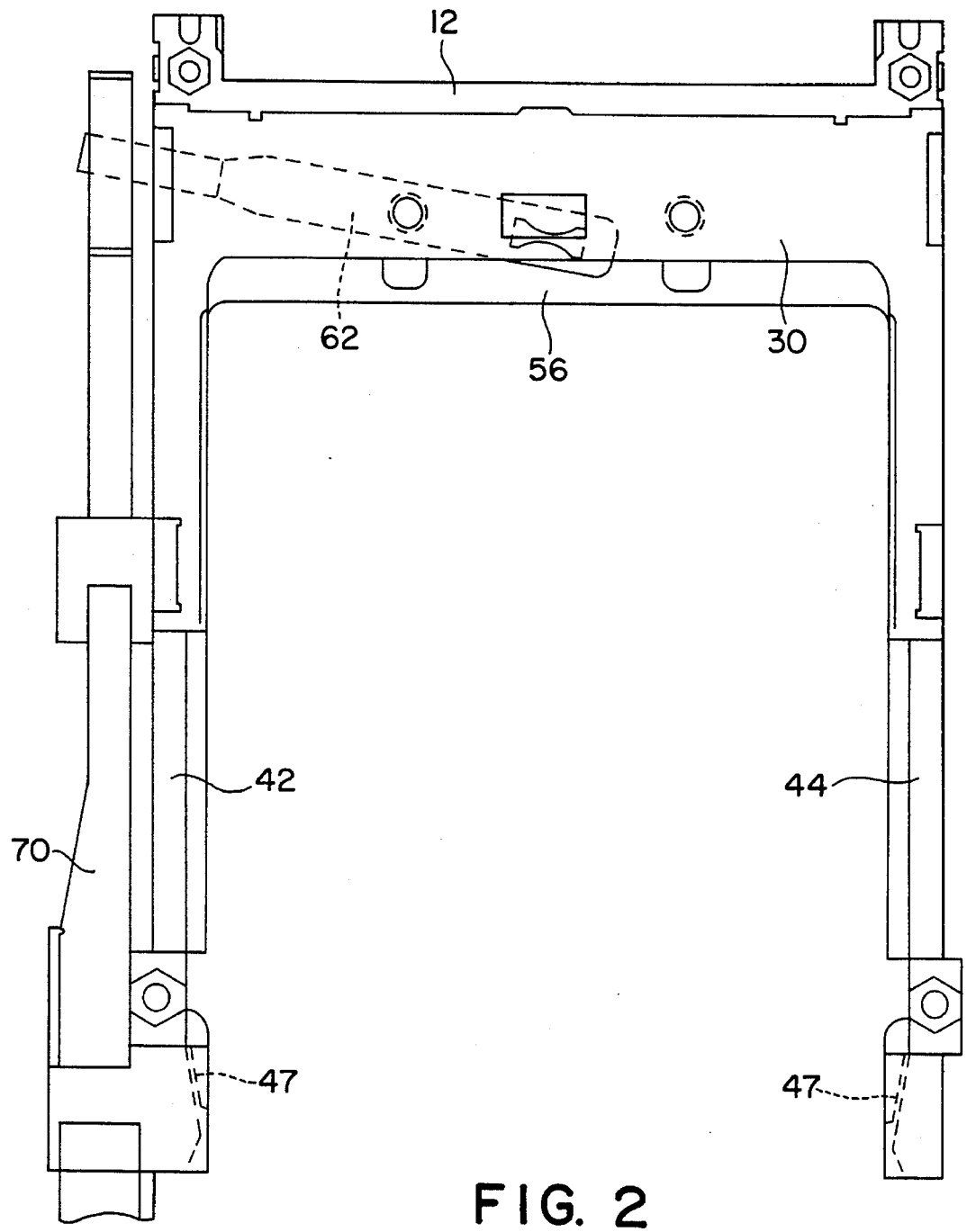
FIG. 2 is top view of the assembled memory card connector of FIG. 1.

In contrast, when the memory card is intended to be removed from the connector 10, the pushing bar 70 is actuated by an external force acting approximate the stopper 74 to move forwardly. Therefore, the distal end 65 of the lever 65 is forced to move forward, and the hole 63 at the opposite end therefore naturally moves rearward contrarily. So, the first plate projection 59 of the sliding plate 56 is actuated to connectedly move rearward and thus the downward protruding second plate projections 61 thereof push the below inserted memory card outwardly (rearward), as shown in FIG. 2, due to its engagement with the front mating surface of the memory card. The forward movement of the pushing bar 70 stops when the stopper 74 confronts the corresponding rear end portion of the left guiding arm 42 wherein the latching projection 53 can be properly received in the notch 75 of the pushing bar 70 for retaining such pushing bar 70 in position. Oppositely, the rearward movement of the sliding plate 56 is restrained by each flange 38 of the securing plate 30 abutting against the front edge of the periphery of the corresponding aperture 60. Under this situation, the extension sections 58 of the sliding plate 56 can be properly seated in the corresponding recesses 55 of the guiding arms 42, 44, respectively. It is also noted that the lengthwise dimension of the opening 35 in the securing plate 30 should be conformable to the swinging range of the distal end 65 of the lever 62.

It can be seen that the indent 73 is adapted to receive a portion of a hexagon nut of which the rest most portion is embedded in the counter-bore 52 of the left guiding arm 42. The indent 73 allows a range of the movement of the pushing bar 70 without interference of the corresponding aforementioned hexagon nut beside.

Figure 3:
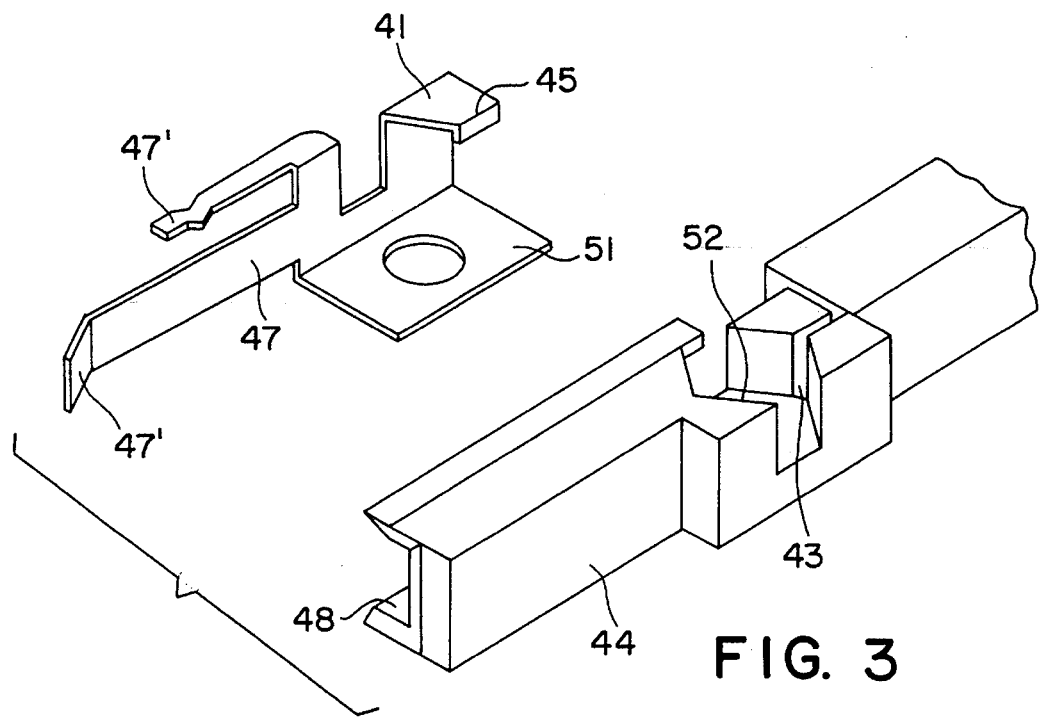
FIG. 3 is an enlarged view of the grounding clip and corresponding portion of the guiding arm to illustrate the structure relation therebetween.

With reference to FIG. 3, the tangs 47' of the grounding clip 47 are positioned in the channels 48 and can touch two sides of the inserted memory card, so that the existing electrostatics can be removed from the surface of the card for not invading the inner electrical circuit through the mating contacts.

Figure 4:
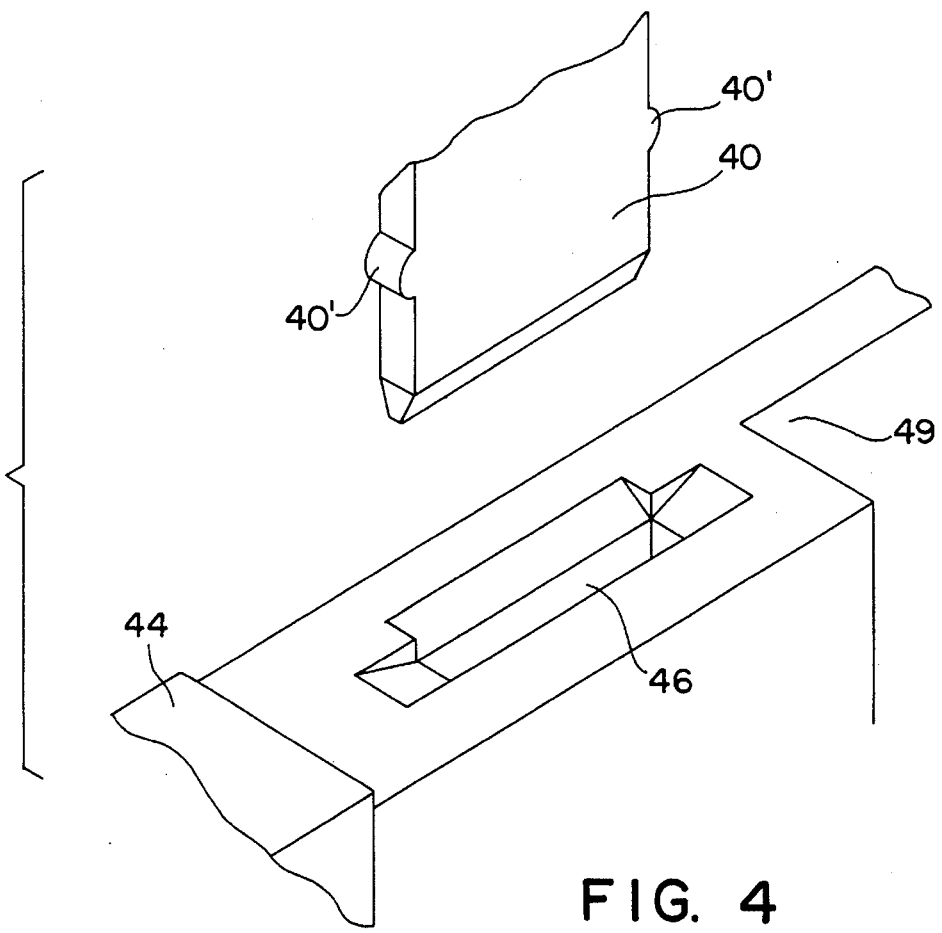
FIG. 4 is an enlarged view of the mounting tab of the securing plate and the corresponding portion of the guiding arm to illustrate the assembling therebetween.

With reference to FIG. 4, the tab 40 of the leg 34 of the securing plate 30 has a pair of protrusions 40' at two lateral sides to interfere within the corresponding cavity 46 of the guiding arm 42 (44) for retention.

Figure 8:
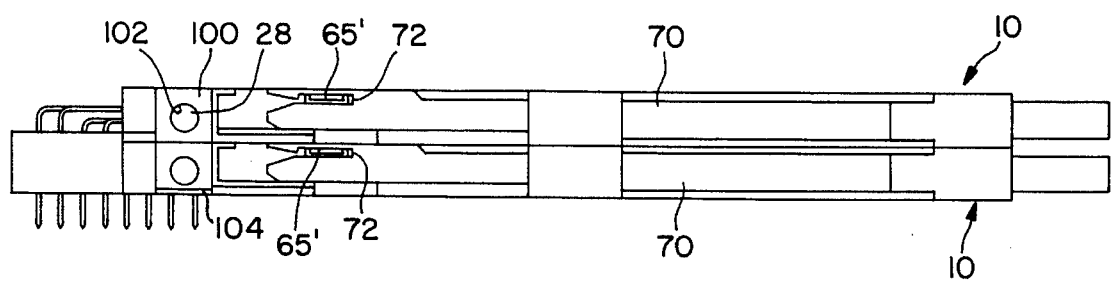
FIG. 8 is a side view of two stacked memory card connectors of FIG. 1.

With referring to FIGS. 1 and 8, two subject memory card connectors 10 stacked together in a special condition, which use a L-shaped bracket 100 having a pair of aligned retaining holes 102 for combining the two bosses 28 of the stacked connectors 10 together. The pad section 104 of the bracket 100 can be soldered onto the board on which the connectors are mounted. Needless to say, these two stacked connectors are also fastened to each other by pairs of the longer screws extending through the corresponding cavities 25 and 52 in the housings 12 and the guiding arms 42, 44.

It is appreciated that in comparison with the prior art memory card connectors, the connector 10 itself in the present invention can be assembled only through a series of latchable snapping operation without any inconvenient riveting or screwing procedure. It saves labor and time during such assembling. Moreover, the connector 10 directly uses the securing plate 30 to fasten two side guiding arms 42 and 44 thereto, thus forming an initial U-shaped unit for cooperation with the housing 12 attached thereto. Differently, most prior art memory card connectors includes substantially an insulative rigid plate integrally molded with the side guiding arms in their structures, thus precluding reduction of the height of the connector 10. In contrast, without such redundant portion in the structure, the connector 10 in the present invention can not only achieve the low profile feature for conformity with the requirement of the recent trend, but also save the insulative material. Additionally, different from the most prior art memory card connectors, the guiding arms 42, 44 of the connector 10 in the present invention are not formed integral with the housing 12. Because only the expensive material which has a good property of heat-resistance is required around the passageways 16 which receive the contacts generating the temperature, an inexpensive material can be adopted in the guiding arms 42, 44, which is different from the material used in the main body 14 of the housing 12 in the present invention. Therefore, the material cost can be down.

It is noted that in the assembled memory card connector of the present invention, using a pin inserted into the aperture 33 and pressing the protrusion 20 of the engaging arm 18 inwardly can release the engagement between the protrusion 20 of the engaging arm 18 and the aperture 33 of the securing plate 30, so that the housing 12 can be detached from the assembled U-shaped unit. Then, such U-shaped unit can be disassembled to the individual components in an order reversed to the aforementioned assembly procedure.

While the present invention has been described with reference to a few specific embodiments, the description is illustrative of the invention and is not to be construed as limiting the invention. Various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. A memory card connector for use with a memory card comprising:

an insulative housing including a main body and two engaging arms integrally extending rearward from two opposite ends thereof;

a plurality of contacts positioned in the main body of the housing for coupling a plurality of corresponding contacts of the memory card;

a securing plate including an elongated base and two legs integrally extending rearward from two opposite ends thereof;

a pair of spaced insulative guiding arms respectively attached to the corresponding legs of the securing plate, thus the securing plate being the only support to secure said guiding arms in position;

a sliding plate positioned above the housing and a front end portion of the guiding arms and below the securing plate, and being moveable in a front-to-end direction;

an eject lever sandwiched between the securing plate and the sliding plate and pivotally retained around a pivoting point;

a pushing bar movably positioned beside one of the guiding arms, a front end of the pushing bar engaging a distal end of the lever, and another end of said lever opposite to said distal end engaging the sliding plate, so that when the pushing bar is moved forwardly, the sliding plate can be moved rearward by means of rotation of the lever connected therebetween to eject the inserted memory card out of said memory card connector wherein the securing plate, the lever, the sliding plate, two guiding arms and the pushing bar can be pre-assembled as a unit, and to fasten to the housing to form the final connector without any screwing or riveting operation.

2. The memory card connector as described in claim 1, wherein a protrusion is positioned at a free end of each engaging arm of the housing to latchably engage an aperture of the corresponding leg of the securing plate for fixing the housing to the securing plat.

3. The memory card connector as described in claim 1, wherein a tab extends downward from an end of each leg of the securing plate to be inteferentially retained within a cavity of the corresponding guiding arm.

4. The memory card connector as described in claim 1, wherein a grounding clip is attached to a rear end of each guiding arm for removal of electrostatics on the inserted memory card.

5. The memory card connector as described in claim 1, wherein the sliding plate includes an upwardly extending first plate projection to engage in a hourglass-like hole of the lever for connective movement therewith, and a pair of downward extending second plate projections for abutting against the mating surface of the memory card and pushing the inserted memory card outwardly.

6. The memory card connector as described in claim 1, wherein the sliding plate includes a base section and a pair of extension sections extending rearward from two opposite ends thereof.

7. The memory card connector as described in claim 1, wherein the front end of the pushing bar has a horizontal through slot for receivably engaging the distal end of the lever.

8. The memory card connector as described in claim 1, wherein the housing includes a pair of boss on side walls thereof to corporate a pair of L-shaped brackets for stacking two identical memory card connectors together.

9. The memory card connector as described in claim 1, wherein the guiding arms define a pair of inside channels facing to each other for reception of two side edges of the memory card so that said memory card can be inserted into the connector along said pair of channels of the guiding arms until a front mating surface of the memory card confronts a corresponding mating surface of the main body of the housing.

10. The memory card connector as described in claim 1, wherein the securing plate includes a round flange rearward extending therefrom and the lever includes a round hole for properly receiving said flange of the securing plate therein for defining said pivoting point around which the lever is rotated.

11. The memory card connector as described in claim 10, wherein the sliding plate includes a longitudinal aperture to cooperate with said flange of the securing plate for aligning movement of the sliding plate.

12. The memory card connector as described in claim 1, wherein the leg of the securing plate includes a side wall to form a angle iron shape for shielding an end portion of the engaging arm of the housing which is positioned in a space of the front end portion of the corresponding guiding arm.

13. The memory card connector as described in claim 12, wherein an opening is disposed at each end of the base of the securing plate for allowing the distal end of the lever to extend therethrough.

14. A U-shaped pre-assembled unit for use with a housing in a memory card connector, comprising:

a securing plate stamped from a metal blank including an elongated base and two legs extending rearward from two opposite ends thereof;

a pair of spaced insulative arms respectively fixed to the corresponding legs of the securing plate, thus the securing plate being the only one support to secure said guiding arms in position;

a sliding plate being moveable in a front-to-end direction and positioned above the guiding arms and below the securing plate, said sliding plate including a base section and two extension sections extending rearward from two opposite ends thereof, an end portion of each extension sections being adapted to be slidably received in a recess positioned at a front end portion of the corresponding guiding arm so that said sliding plate can be movably retained between the guiding arms and the securing plate;

an eject lever sandwiched between the securing plate and the sliding plate, and pivotally retained around a round means of the securing plate;

a pushing bar movably positioned beside one of the guiding arms, a front end of the pushing bar engaging a distal end of the lever, and another end of said lever opposite to said distal end engaging the sliding plate, so that when the pushing bar is moved forwardly, the sliding plate can be moved rearward by means of rotation of the lever connected therebetween to eject an inserted memory card out of said memory card connector wherein the securing plate, the lever, the sliding plate, two guiding arms and the pushing bar can be pre-assembled as a unit, and to fasten to the housing to form the final connector without any screwing or riveting operation.

15. The unit as described in claim 14, wherein the pair of guiding arms respectively define a pair of inside channels facing to each other for reception of two side edges of the memory card so that said memory card can be inserted into the connector along said pair of channels of the guiding arms.

16. The unit as described in claim 14, wherein each leg of the securing plate is of angle iron shape including a tab extending downward for interferential engagement within a cavity in the corresponding guiding arm, and including an aperture to incorporate a protrusion of the housing for latchably fastening the housing thereto.

* * * * *